US009191442B2

(12) United States Patent
Kuntagod et al.

(10) Patent No.: US 9,191,442 B2
(45) Date of Patent: Nov. 17, 2015

(54) ADAPTIVE SENSOR DATA SELECTION AND SAMPLING BASED ON CURRENT AND FUTURE CONTEXT

(75) Inventors: Nataraj Kuntagod, Karnataka (IN); Sanjoy Paul, Karnataka (IN)

(73) Assignee: Accenture Global Services Limited, Dublin (IE)

( * ) Notice: Subject to any disclaimer, the term of this patent is extended or adjusted under 35 U.S.C. 154(b) by 541 days.

(21) Appl. No.: 13/616,151

(22) Filed: Sep. 14, 2012

(65) Prior Publication Data
US 2013/0282149 A1 Oct. 24, 2013

(30) Foreign Application Priority Data

Apr. 3, 2012 (IN) .......................... 1332/CHE/2012

(51) Int. Cl.
*G06N 5/00* (2006.01)
*H04L 29/08* (2006.01)
*H04W 4/00* (2009.01)
*H04W 4/02* (2009.01)
*H04W 84/18* (2009.01)

(52) U.S. Cl.
CPC ............... *H04L 67/12* (2013.01); *H04W 4/006* (2013.01); *H04W 4/023* (2013.01); *H04W 84/18* (2013.01)

(58) Field of Classification Search
CPC ...................................................... H04L 67/12
See application file for complete search history.

(56) References Cited

U.S. PATENT DOCUMENTS

| 7,603,112 | B2 | 10/2009 | Huomo et al. |
| 2002/0173295 | A1 | 11/2002 | Nykanen et al. |
| 2006/0128349 | A1* | 6/2006 | Yoon ............................ 455/343.2 |
| 2007/0080288 | A1 | 4/2007 | Lim et al. |
| 2009/0185542 | A1 | 7/2009 | Zhang et al. |
| 2013/0103348 | A1* | 4/2013 | Cao et al. ....................... 702/181 |
| 2014/0136696 | A1* | 5/2014 | Leppanen et al. ............ 709/224 |

FOREIGN PATENT DOCUMENTS

WO WO 2012/001215 1/2012

OTHER PUBLICATIONS

Gellersen et al., Multi-Sensor Context-Awareness in Mobile Devices and Smart Artifacts, 2002, Mobile Networks and Applications, 7, 341-351.*
Jani Mantyjarvi, *Sensor-based context recognition for mobile applications*, VTT Publications 511, ESPOO 2003, http://vtt.fi/inf/pdf/publications/2003/P511.pdf.
Hans-W. Gellersen et al., *Multi-Sensor Context-Awareness in Mobile Devices and Smart Artefacts*, http://comp.eprints.lancs.ac.uk/539/1/2002-Gellersen-Artefacts.pdf.
European Search Report for Application No. 12008002.3-1853 dated Feb. 22, 2013 (7 pages).

* cited by examiner

*Primary Examiner* — Alan Chen
(74) *Attorney, Agent, or Firm* — Harrity & Harrity, LLP

(57) ABSTRACT

A method for controlling a sensor may be performed by a mobile device including a processor and a memory. The method may include receiving raw data from the sensor, classifying the raw data into a context value, interpreting the context value into a higher-level context, receiving a predicted context based on the higher-level context, and controlling the sensor based on the predicted context. Controlling the sensor may include controlling a frequency at which raw data is received from the sensor, or an on/off state of the sensor. Control of the sensor may also be based on both the higher-level context and the predicted context.

24 Claims, 5 Drawing Sheets

| Sensor | Context type | Context value |
| --- | --- | --- |
| Temperature | Environment:Temperature | (Cold, Normal, Hot) |
| GPS | Environment:Location:GPS | (inside, outside) |
| Accelerometer | User:Activity:PeriodicMovement | (Brisk Walking, Running, Normal movements) |
| Light | Environment:Light:Type | (Artificial, Natural) |
| Light | Environment:Light:Intensity | (Dark, Normal, Bright) |
| ECG sensor | Physiological:VitalSign:HeartRate | (Normal, High) |

| Sensor | Context type | Context value |
| --- | --- | --- |
| Temperature | Environment:Temperature | (Cold, Normal, Hot) |
| GPS | Environment:Location:GPS | (inside intersection zone, outside intersection zone) |
| OBD-II | Environment:Car:Speed | (Normal, Low, High) |
| Light | Environment:Light:Type | (Artificial, Natural) |
| Light | Environment:Light:Intensity | (Dark, Normal, Bright) |

ADAPTIVE SENSOR DATA SELECTION AND SAMPLING BASED ON CURRENT AND FUTURE CONTEXT

This application is related to and claims the benefit of priority from prior India Application No. 1332/CHE/2012, filed Apr. 3, 2012, the disclosure of which is hereby incorporated by reference.

FIELD OF THE DISCLOSURE

This disclosure is directed to systems and methods for controlling sensors, more particularly, this disclosure is directed to systems, methods and computer programs embodied on non-transitory computer-readable media for adaptive sensor data selection and sampling based on current and future context.

BACKGROUND

Mobile devices such as smart phones are rapidly evolving and maturing as a platform that serves the computational and communication needs of people in their everyday lives. A growing number of smart phones have embedded sensors which can sense the user's environment. For example, many smart phones come with built in accelerometers, GPS, light sensors, microphones, proximity sensors, cameras, compasses, and gyroscopes. Additionally, there are many sensors available that can communicate over low power RF communication and push data to phones.

These sensors, along with the local computational power of the smart phone and the communication capability built into the phone, enable various proactive applications to be provided in fields such as location-based tracking, healthcare, remote monitoring, and environmental monitoring. Conventional proactive applications continuously read and process the sensor data to generate higher-level contexts. The conventional proactive applications may take actions based on the higher-level contexts derived from the sensor data. However, in conventional proactive applications, the communication between the sensors and the phone is only one way: the sensors output the data, and the phone reads the data. Also, conventional proactive applications do not generate or consider future context when taking the prescribed action.

Providing proactive services and applications involves continuous monitoring of the user context, which requires reading the sensor data stream and deriving higher-level contexts from the data. The continuous reading and processing of data from the sensors can be very resource-intensive on the device. In a sensor-rich environment where multiple applications are operating concurrently on the device, the quality, quantity, and timeliness of the proactive applications may be limited by the limited resources of the mobile.

For example, continuous sampling of the sensor data may drain the battery in a relatively short period of time. Also, the processing of the sensor data from the many sensors is limited by the relatively small computational power of a mobile device. Thus, using conventional systems and methods, it is difficult to provide a rich variety of proactive services that are delivered in a sustained manner.

Accordingly, it is desirable to provide systems and methods for adaptive sensor data selection and sampling based on current and future context, where there is two-way communication between the sensors and the mobile device, allowing the selection and sampling frequency of the sensors to be controlled. It is also desirable to provide systems and methods for adaptive sensor data selection and sampling based on current and future context, where a mobile device acts as a gateway for transmitting data between sensors and a server. It is further desirable to provide systems and methods for adaptive sensor data selection and sampling based on current and future context, where an additional action is taken based on the future context.

Accordingly, systems, methods and computer programs embodied on non-transitory computer-readable media are provided for adaptive sensor data selection and sampling based on current and future context, as disclosed herein.

SUMMARY

Consistent with the disclosure, embodiments of systems and methods for adaptive sensor data selection and sampling based on current and future context are disclosed.

According to one embodiment, a method for controlling a sensor may be performed by a mobile device including a processor and a memory. The method may include receiving raw data from the sensor, classifying the raw data into a context value, interpreting the context value into a higher-level context, receiving a predicted context based on the higher-level context, and controlling the sensor based on the predicted context.

The controlling may also include controlling the sensor based on the higher-level context and the predicted context.

The controlling may also include controlling at least one of a frequency at which raw data is received from the sensor, or an on/off state of the sensor.

The controlling may also include adjusting, over time, based on the predicted context, at least one of the frequency at which raw data is received from the sensor, or the on/off state of the sensor.

The method may further include receiving raw data from a plurality of sensors, classifying the raw data from the plurality of sensors into a plurality of context values, interpreting the plurality of context values into the higher-level context, and controlling the plurality of sensors based on the higher-level context and the predicted context.

The controlling may also include controlling at least one of a frequency at which raw data is received from each sensor of the sensors, or a selection of sensors of the sensors to be enabled.

The controlling may also include turning off at least one sensor of the sensors and increasing a sampling frequency of at least one other sensor of the sensors.

The method may further include sending the higher-level context to a server configured to determine the predicted context from the higher-level context, and receiving the predicted context from the server.

The interpreting the context value into the higher-level context may be performed by one of the mobile device or the server based on whether an amount of processing required for the interpreting exceeds a threshold processing limit.

In one embodiment, the sensor may be physically integrated with the mobile device.

In another embodiment, the sensor may be not physically integrated with the mobile device and may communicate wirelessly with the mobile device.

According to another embodiment, a system for controlling sensors may comprise a plurality of sensors, a mobile device including a processor and a memory, and a server. The mobile device may be configured to receive raw data from the sensors, classify the raw data into context values, interpret the context values into a higher-level context send the higher-level context to the server receive a predicted context based on the higher-level context from the server, and control the plurality of sensors based on the predicted context.

The server may be configured to receive the higher-level context and generate the predicted context based on the higher-level context.

The controlling the plurality of sensors may include controlling at least one of a frequency at which raw data is received from the sensors, or a selection of sensors to be enabled.

The controlling may further include adjusting, over time, based on the predicted context, at least one of the frequency at which raw data is received from each sensor of the sensors, or the selection of sensors of the sensors to be enabled.

In one embodiment, at least one of the sensors may be physically integrated with the mobile device.

In another embodiment, at least sensor of the sensors may be not physically integrated with the mobile device and may communicate wirelessly with the mobile device.

In another embodiment, the mobile device may be a cell phone.

According to another embodiment, a non-transitory computer-readable storage medium storing instructions which, when executed by a processor, cause the processor to perform a method for controlling a plurality of sensors is provided. The method may include receiving raw data from the sensors, classifying the raw data into context values, interpreting the context values into a higher-level context, receiving a predicted context based on the higher-level context, and controlling the sensors based on the higher-level context and the predicted context.

The controlling may include controlling at least one of a frequency at which raw data is received from each of the sensors, or a selection of the sensors to be enabled.

The controlling may include turning off at least one sensor and increasing a sampling frequency of at least one other sensor.

It is to be understood that both the foregoing general description and the following detailed description are exemplary and explanatory only and are not restrictive of the invention, as claimed.

The accompanying drawings, which are incorporated in and constitute a part of this specification, illustrate several example embodiments of the disclosure and together with the description, serve to explain the principles of the embodiments of the disclosure.

BRIEF DESCRIPTION OF THE DRAWINGS

FIG. 4 is an illustration of an exemplary healthcare application for wellness monitoring according to embodiments of the disclosure.

DESCRIPTION OF THE EMBODIMENTS

Reference will now be made in detail to the present exemplary embodiments, examples of which are illustrated in the accompanying drawings. Wherever possible, the same reference numbers will be used throughout the drawings to refer to the same or like parts.

Figure 1:
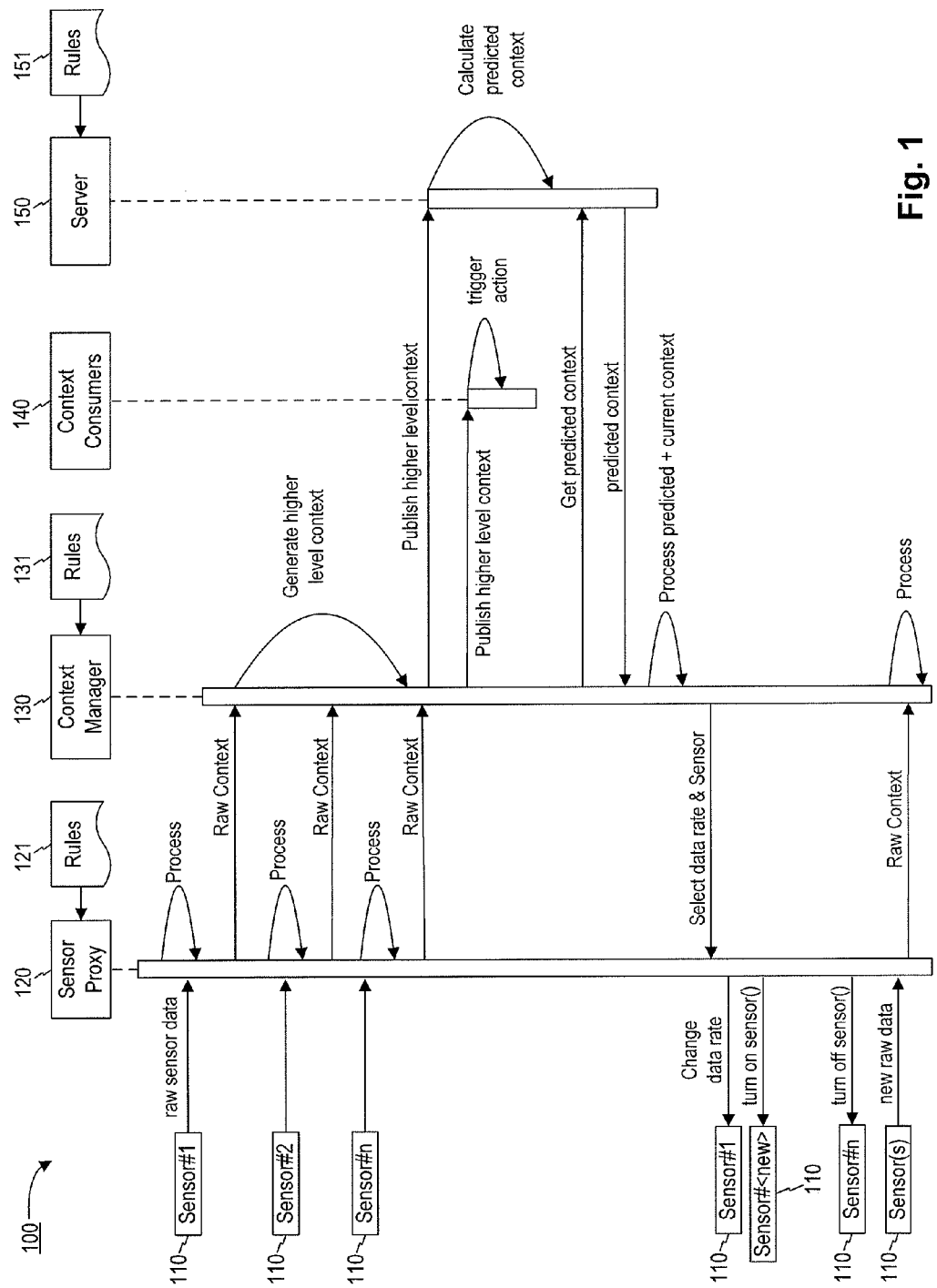
FIG. 1 is an illustration of an overview of an exemplary system according to embodiments of the disclosure.

FIG. 1 illustrates an overview of a system 100 for performing adaptive sensor data selection and sampling based on current and future context according to an embodiment of the disclosure. The system 100 may include one or more sensors 110. The sensors 110 may be any of presently known or commercially available sensors that perform measurements and output results of the measurements. As a non-limiting and non-exhaustive exemplary list, the sensors 110 may include cameras, microphones, gyroscopes, accelerometers, heart rate monitors, and blood pressure monitors, as well as other sensors that measure light, sound, temperature, location, pressure, time, distance, speed, and other physical quantities. The system 100 may also incorporate newly developed sensors. As described herein, the term sensor may include both sensing devices and actuators used to control the sensing devices.

The sensors 110 may be physically integrated into a mobile device, or may be separate from a mobile device and may communicate with the mobile device through wired and/or wireless communication means. The mobile device may be, for example, a cell phone, personal digital assistant (PDA), tablet, laptop, part of an on-board vehicle electronic system, or other portable computing device.

The sensors 110 may provide raw sensor data to a sensor proxy 120. The sensor proxy 120 may be a single sensor proxy, or may include several sensor proxies, for example, one sensor proxy 120 for each sensor 110. The sensor proxy 120 may be embodied as software stored in a computer-readable, non-transitory storage medium, which when executed by a processor, causes the processor and storage medium to operate as a sensor proxy. Alternatively, the sensor proxy 120 may be embodied in hardware configured to operate as a sensor proxy. For example, the sensor proxy 120 may be embodied in an application specific integrated circuit (ASIC), a field programmable gate array (FPGA), or other appropriate electronic circuitry.

The sensor proxy 120 may receive the raw sensor data from the sensors 110 and process the raw sensor data to determine a raw context or context value from the raw sensor data. For example, the raw sensor data may be a stream of bits or other data representing a sensed value. In one embodiment, a sensor may be a temperature sensor, and the raw sensor data may represent a temperature of 40° C. The sensor proxy may interpret the sensor data as the temperature of 40° C., and determine that a temperature of 40° C. corresponds to a context value of one of a low, medium, or high temperature. The determination of whether the sensed temperature is low, medium, or high may be based on rules 121 provided to the proxy sensor 120, as illustrated in FIG. 1. For example, if an application context in which the system 100 is operating requires an outdoor temperature, the rules 121 may define a temperature of 40° C. to be considered "high." If the application context in which the system 100 is operating requires an oven temperature, however, the rules 121 may define a temperature of 40° C. to be considered "low." The rules 121 may include a set of definitions used by the sensor proxy 120 to interpret the raw sensor data and generate appropriate context values. By receiving and processing raw sensor data to obtain context values, the proxy sensor 120 may reduce the amount of data that is sent for further processing.

The raw context or context values may be provided to a context manager 130. The context manager 130 may be embodied as software stored in a computer-readable, non-transitory storage medium, which when executed by a processor, causes the processor and storage medium to operate as a context manager. Alternatively, the context manager 130 may be embodied in hardware configured to operate as a context manager. For example, the context manager 130 may be embodied in an application specific integrated circuit (ASIC), a field programmable gate array (FPGA), or other appropriate electronic circuitry. The context manager 130 and the sensor proxy 120 may also be integrated into a single software or hardware module.

The context manager 130 may receive context values from the sensor proxy 120 for one or more of the sensors 110. The context manager 130 may then interpret the one or more context values to generate a higher context value. The higher-level context may be a context where there is no physical sensor to directly obtain the context, but the higher-level context may be based on data from physical sensors. The higher context value may be generated based on rules 131 provided to the context manager 130. For example, in one embodiment, the system 100 may include a temperature sensor, a GPS or location sensor, and a light sensor. The sensor proxy 120 may generate a context value of "cold" from the temperature sensor, "outside the house" from the GPS, and "dark" from the light sensor. Based on these context values, the context manager 130 may generate a higher-level context "evening." In another embodiment, if the higher-level context is based on a single context value, the higher-level context may be the same as the context value in some instances.

The higher-level context may then be published to one or more context consumers 140. Publishing the higher-level context data to context consumers 140 may include selecting an appropriate consumer from a plurality of consumers. For example, context consumers 140 may be applications running on a mobile phone. If the higher-level context is related to health monitoring, a health monitoring application may be selected as the context consumer to which the higher-level context is published. In another embodiment, the higher-level context may be published to a database accessible by applications, and the applications may determine whether the higher-level context is of interest to them.

Based on the published higher-level context, the context consumer 140 may trigger a related action. For example, if the context consumer 140 is a health monitoring application and the higher-level context is "patient needs assistance," then the trigger may be calling a nurse, or notifying an appropriate other application to call a nurse.

The higher-level context may also be published to a server 150. The server 150 may include a processor, storage, a memory, and input/output (I/O) devices (not shown). The server 150 may be implemented in various ways. For example, the server 150 may be a general-purpose computer, a server, a mainframe computer, or any combination of these components. The server 150 may be standalone, or it may be part of a subsystem, which may, in turn, be part of a larger system. For example, the server 150 may be a dedicated server, or may be embodied within the cloud. The context manager 130 may communicate with the server 150 over a link with a network. For example, the link may be a direct communication link, a LAN, a WAN, or other suitable connection. The network may include the internet.

The server 150 may be configured to generate a predicted context or future context based on the higher-level context received from the context manager 130 and rules 151 provided to the server 150. The generation of the predicted context or future context may use algorithms such as fixed-length Markov models, prediction by partial matching (PPM), or other standard algorithms. The predicted context represents a context that the server 150 determines is likely at a specific future time. For example, from the rules 151, the server 150 may know that a user may experience heart problems after approximately thirty minutes of running outdoors in cold weather. If the higher-level context (derived from the context values) is "running outdoors in cold weather," then the server 150 may generate a predicted context that "in thirty minutes the user may experience heart problems."

The server 150 may send the predicted context to the context manager 130. Alternatively, the context manager 130 may request the predicted context from the server 150, and the server 150 may provide the predicted context in response to the request from the context manager 130. The predicted context may be for a specified future time, for example, thirty minutes in the future. The future time may be specified by the context manager 130, the server 150, or the rules 151. In one embodiment, a default future time may be specified by the context manager 130, the server 150, or the rules 151.

The predicted context and the higher-level context may be combined into a complex context. The context manager 130 may then generate an appropriate selection of sensors 110 and sensor sampling frequencies based on the predicted context, the higher-level context, or the complex context. The context manager 130 may preferably generate an appropriate selection of sensor 110 and sensor sampling frequencies based on the complex context. The context manager 130 may base the selection of sensor 110 and sensor sampling frequencies based on the rules 131 and to minimize battery usage or minimize processing requirements of the system 100. The context manager 130 may provide the sensor selection and sensor sampling frequency to the sensor proxy 120.

The sensor proxy 120 may then control the sensors 110 based on the sensor selection and sensor sampling frequency data provided by the context manager 130. The proxy sensor 120 may control the sensors 110 using actuators associated with or integrated into the sensors 110. For example, sensors 110 that were previously enabled or on, but that are not included in the sensor selection data, may be disabled or turned off by the sensor proxy 120, or the sensor proxy 120 may provide instructions to the sensors 110 or actuators associated with the sensors 110 to disable or turn off the sensors 110 that are not included in the sensor selection data. Sensors 110 that were previously disabled or off, but that are included in the sensor selection data, may be enabled or turned on by the sensor proxy 120, or the sensor proxy 120 may provide instructions to the sensors 110 or actuators associated with the sensors 110 to enable or turn on the sensors 110 that are included in the sensor selection data. Sensors 110 that are included in the sensor selection may be controlled by the sensor proxy 120 to set a sampling and output frequency in accordance with the sensor sampling frequency data provided by the context manager 130. For example, if two sensors are an ambient temperature sensor and a heart rate monitoring sensor, and the predicted context is "in thirty minutes the user may experience heart problems," then the sensor selection and sampling frequency data provided by the context manager 130 may include the selection of the heart rate monitoring sensor, and may indicate a significant increase in the frequency of sampling of the heart rate monitoring sensor as the thirty-minute mark approaches. Because the temperature sensor was not selected, the temperature sensor would be disabled.

Operation of the system 100 may continue, with the sensors gathering and sending raw sensor data to the sensor proxy 120, the sensor proxy 120 generating context values based on the raw sensor data, the context manager 130 generating and publishing a higher-level context from the context values, the server 150 generating a predicted context based on the higher-level context, the context manager 130 generating sensor selection and sampling frequency data based on the higher-level context and the predicted context, and the sensor proxy 120 controlling the sensors 110 based on the sensor selection and sampling frequency data.

Figure 2:
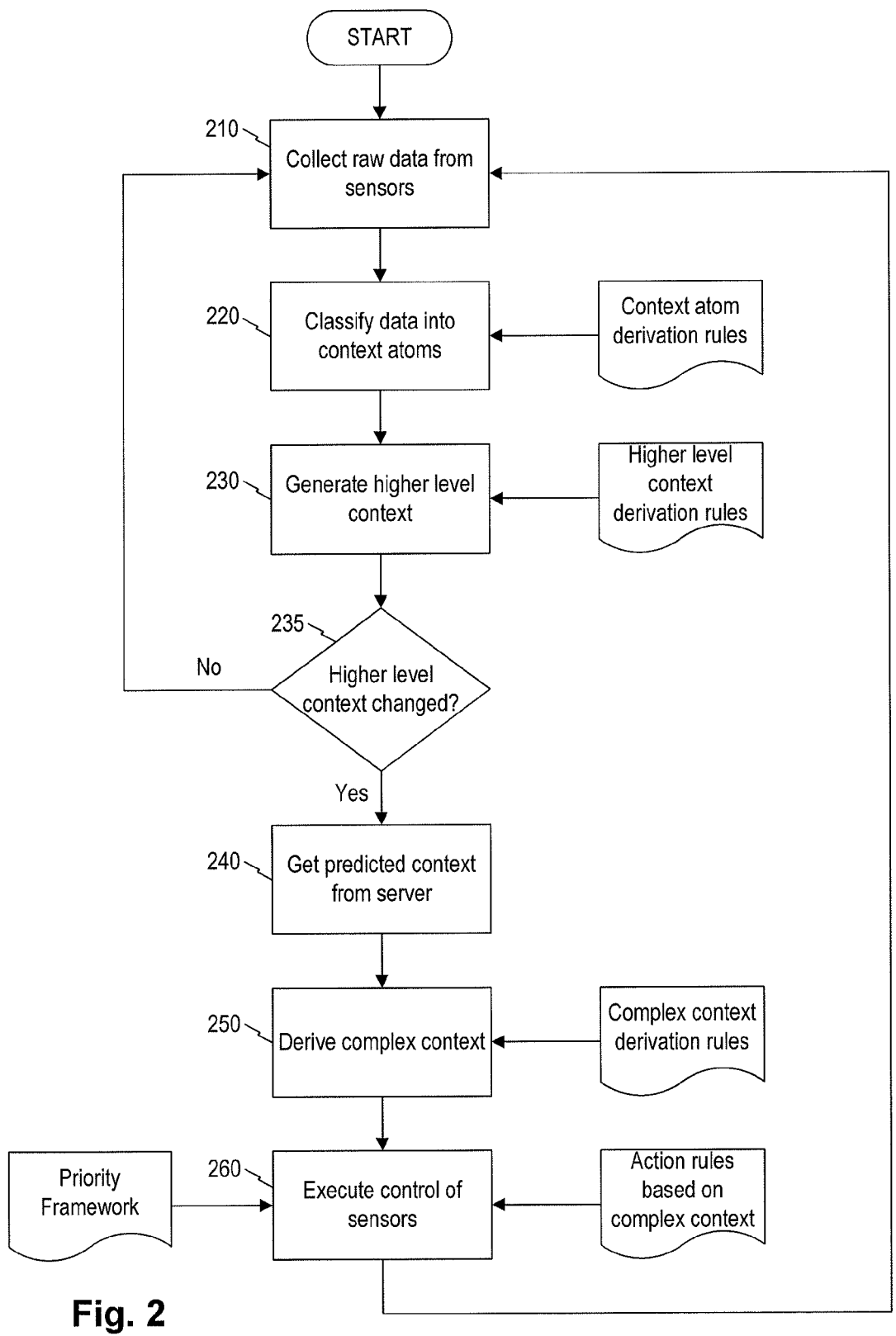
FIG. 2 is an illustration of an exemplary method according to embodiments of the disclosure.

FIG. 2 is an illustration of an exemplary method for adaptive sensor data selection and sampling based on current and future context according to embodiments of the disclosure. In step 210, the sensor proxy 120 may read raw data from one or more sensors. The sensors may be the same or similar to sensors 110 described above. In step 220, the raw data from the sensors may be classified into context atoms, that is, context values, based on context atoms derivation rules. In one embodiment, a determination of the amount of processing required to process the raw sensor data may be made, and if the amount of processing required exceeds a threshold, the processing of the raw sensor data may be performed by a server, while if the amount of processing required does not exceed the threshold, the processing of the raw sensor data may be performed by the sensor proxy 120, for example, as described above. The threshold may be based on the available processing power of the sensor proxy 120.

In step 230, higher-level context may be generated from the context atoms. The higher-level context may be generated in accordance with higher-level context derivation rules. In one embodiment, a determination of the amount of processing required to generate the higher-level context may be made, and if the amount of processing required exceeds a threshold, the generating of the higher-level context may be performed by a server, while if the amount of processing required does not exceed the threshold, the generating of the higher-level context may be performed by the context manager 130. The threshold may be based on the available processing power of the context manager 130.

In step 235, a determination whether the higher-level context has changed may be made. In one embodiment, the higher-level context may be stored in a memory, and the context manager 130 may compare the currently generated higher-level context with the immediately prior higher-level context to determine whether the higher-level context has changed. In another embodiment, the server 150 may determine whether the higher-level context has changed.

If the higher-level context has not changed since the previous higher-level context was generated, operation of the method may return to step 210. That is, in one embodiment, it may be assumed that if the higher-level context has not changed, that the predicted context will also not change, and the sensor selection and frequency data will remain unchanged.

If the higher-level context has changed since the previous higher-level context was generated, operation of the method may proceed to step 240. In another embodiment, step 235 may be omitted so that even if the higher-level context has not changed, the context manager 130 will request the predicted context from the server 150, and operation of the method will proceed to step 240.

In step 240, the context manager 130 may receive a predicted context generated by the server 150 based on the higher-level context. The context manager 130 may send the higher-level context with a request for a predicted context to the server 150. In one embodiment, the request may include a specific future time for the predicted context, for example, the context manager 130 may request a predicted context that represents a predicted context after a specified time duration, such as thirty minute from the present time, or at a specific time, such as 7:00 AM on a specific day. In one embodiment, if no predicted context is available from the server 150, the server 150 may return an indication that no predicted context is available, and operation of the method may return to step 210. Alternatively, if no predicted context is available based on the request from the context manager 130, the server 150 may return a predicted context for a future time that is available.

In step 250, a complex context may be derived from the higher-level context and the predicted context. The complex context may be derived by the context manager 130 based on complex context derivation rules provided to the context manager 130.

In step 260, control of the sensors may be executed based on the complex context. The sensor proxy 120 may trigger sensor selection and sampling frequency based on action rules provided to the sensor proxy 120. The action rules may be based on the complex context derived in step 250. When more than one application is running on a mobile device, control of the sensors may be further based on a priority framework that defines rules for handling conflicting sensor selection and sampling frequencies between the applications running on the mobile device.

Figure 3:
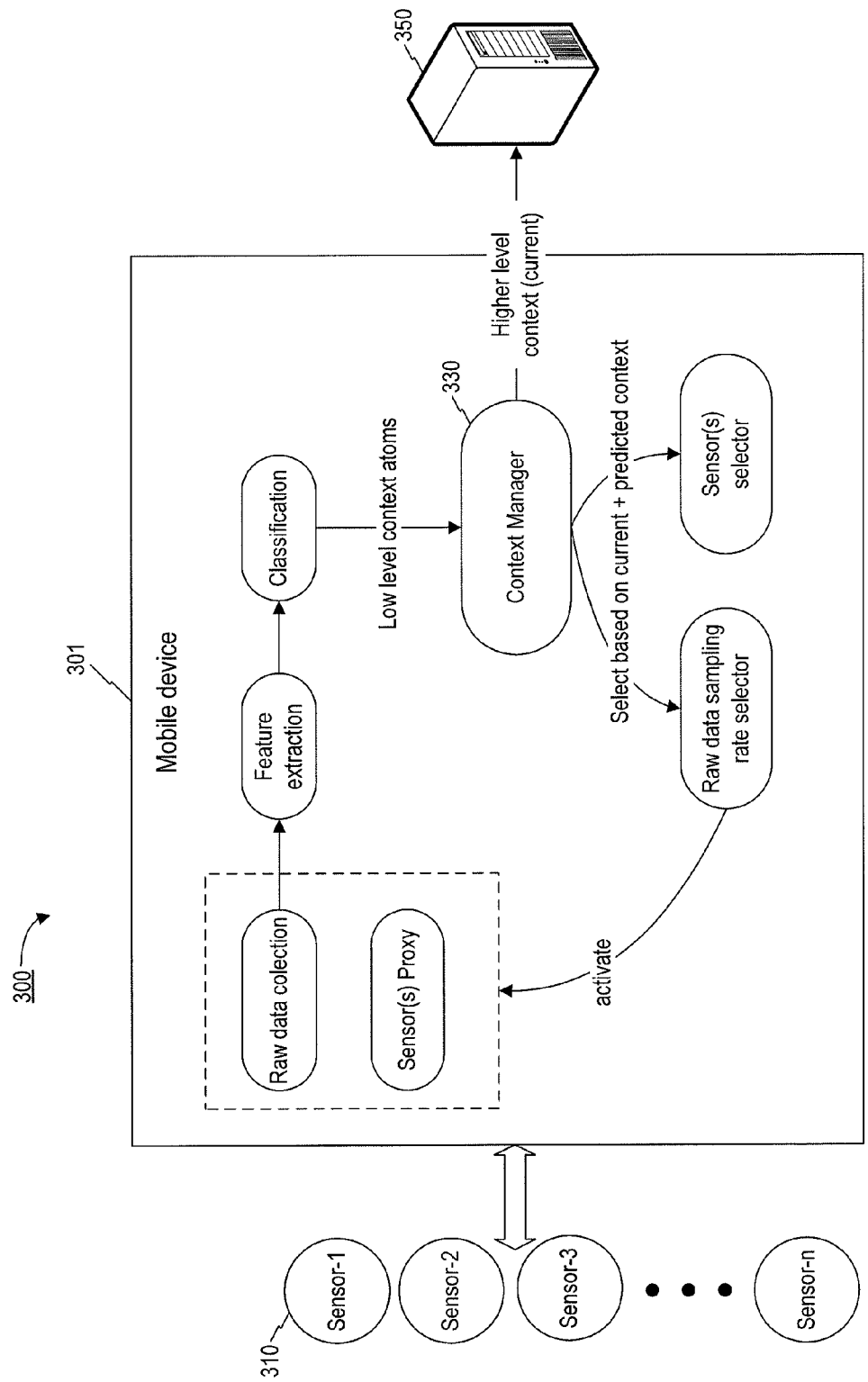
FIG. 3 is an illustration of another exemplary system according to embodiments of the disclosure.

FIG. 3 is an illustration of an exemplary system 300 for adaptive sensor data selection and sampling based on current and future context according to embodiments of the disclosure. In the system 300, the sensor proxy 320 and context manager 330 are part of a mobile device 301. The mobile device 301 may include, for example, a cell phone, personal digital assistant (PDA), tablet, laptop, or other portable computing device. In one embodiment, the mobile device 301 may be part of a vehicle. The mobile device 301 may include one or more computer-readable, non-transitory memory storage devices (memory) and a central processing unit (cpu). The sensor proxy 320 and the context manager 330 may be embodied as software stored in a computer-readable, non-transitory storage medium, which when executed by a processor, causes the processor and storage medium to operate as a sensor proxy and a context manager. Alternatively, the sensory proxy 320 and the context manager 330 may be embodied in hardware configured to operate as a sensory proxy and a context manager. The sensor proxy 320 and context manager 330 may be embodied in separate software modules or separate hardware component, or may be integrated into a single software or hardware module, or some combination thereof.

The system 300 may operate in a manner similar to the operation of the system 100 described above. The sensor proxy 320 may perform raw data collection from the sensors 310. The raw data may be subject to feature extraction and classification to generate low level context atoms, or context values. The context values are provided to the context manager 330. The context manager 330 may generate a higher-level context based on the context values to a server 350. The server 350 may generate a future or predicted context based on the higher-level context provided by the context manager 330. The context manager 330 and sensor proxy 320 may then control the selection of sensors and the raw data sampling rate of the sensors 310 based on the predicted context.

A first example of a system for performing adaptive sensor data selection and sampling based on current and future context according to an embodiment of the disclosure is described with respect to FIG. 4. The first example may be used with a healthcare application for wellness monitoring. FIG. 4 is a chart 400 illustrating sensor types, context types, and context values according to the first example.

In the first example, the system includes five sensors: a temperature sensor, a GPS, an accelerometer, a light sensor, and an ECG sensor. The temperature sensor, GPS, accelerometer, and light sensor may be integral to a mobile device, such as a cell phone, that a user may carry as part of the wellness monitoring. The ECG sensor may be physically separate from the mobile device, but may communicate with the mobile device through infrared, Bluetooth, or other wireless communication protocols.

The chart 400 illustrates the context type and exemplary context values for the data obtained by each of the sensors for the healthcare application. The temperature sensor measures context of type Environment:Temperature, and the context value may be one of cold, normal, or hot. The GPS measures context of type Environment:Location:GPS, and the context value may be one of inside or outside. The Accelerometer measures context of type User:Activity:PeriodicMovement, and the context value may be one of brisk walking, running, or normal movements. The light sensor first measures context of type Environment:Light:Type, and the context value may be one of artificial or natural. The light sensor may also measure context of type Environment:Light:Intensity, and the context value may be one of dark, normal, or bright. The ECG sensor measures context of type Physiological:VitalSign:HeartRate, and the context value may be one of normal or high.

Based on inputs to the system of the first example, the system may know that if the user runs outside in the evening for a half hour when it is cold, the user's heart rate may exhibit arrhythmia. Accordingly, during start up of the system, all of the sensors may be turned off and not transmitting, except for the GPS, which is initially sampled at a low periodic frequency.

The mobile device may monitor the user's location-based on the data from the GPS. If the user moves outside of the house, the context manager may derive a higher-level context "outside the house," which may trigger selection of the light, temperature and accelerometer sensors. After a period of time, the system may detect that the user is running, the temperature is cold, and it is dark outside. From this data, the context manager may generate a higher-level context "user is running outside in the evening while it is cold."

This higher-level context may be sent to the server to determine a predicted context. The predicted context returned by the server may be "user's heart may exhibit arrhythmia after half hour." Based on the higher-level context and the predicted context, the system may select the ECG sensor. All of the other sensors may then be turned off. As time progresses toward the half hour mark indicated in the predicted context, the system may increase the sampling frequency of the ECG sensor to detect fine grained variations in the user's heart beat.

In this first example, if the user did not leave the house, or if he left the house but only walked, then some of the sensors may not need to be turned on, and the sampling frequency of the enabled sensors may remain low. Thus, the adaptive sensor data selection and sampling based on the current and future context according to embodiments of the disclosure may save battery life and processing power, which can then be used by other applications which may rely on other sensors connected to the mobile device for different applications. That is, the selection of appropriate sensors and sensor rates based on the higher-level context and the predicted context enables the system to choose only the relevant sensors which can deliver the right proactive inputs to the user without burdening the system with unnecessary processing and battery drain.

Although the above example describes only a single application running on the mobile device, in practice several applications may be running on the mobile device. Each of the different applications may have different sensor requirements and other environmental requirements. When more than one application is running on the mobile device, and two or more of the applications are using data from one or more of the same sensors, the mobile device may prioritize the applications or the sensors.

For example, a mobile device may be running a healthcare application and a smart-energy application. The healthcare application may determine that a temperature sensor should be turned off because ambient temperature is not necessary for the application. The smart-energy application, however, may need to monitor the ambient temperature to determine whether heating or air conditioning should be utilized, and thus the smart-energy application may determine that the temperature sensor should be turned on. When, as in this example, the sensor selection and sampling frequencies determined by the applications conflict, the mobile device may determine, based on a priority framework, the sensor selection and sampling frequency based on the sensor selection and sampling frequencies determined by the multiple applications running on the mobile device.

As an example of a priority framework, the mobile device may give priority to the affirmative selection of a sensor and the highest sampling frequency. Thus, if one application wants to turn off a sensor, but another application wants to turn on the sensor, the sensor may be selected and turned on based on the priority framework. Similarly, if one application wants the sensor to sample at a low frequency, but another application wants the sensor to sample at a higher frequency, the mobile device may determine to sample the sensor at the higher frequency based on the simple priority framework.

Other priority frameworks may be defined based on the particular needs of the applications running on the mobile device. For example, a situation may arise where one application specifically needs a sensor to be turned off where that sensor may interfere with the operation of another sensor, while another application may specifically need the sensor to be turned on. In this case, the priority framework may define a priority of one of the applications over the other, and the mobile device may set the sensor selection accordingly.

In one embodiment, the rules 121 and 131 provided to the sensor proxy 120 and context manager 130 may include an indication whether the sensors being used by each application are mandatory or optional. When the conflicting sensor selection and sampling frequencies are between applications where one application indicates that the sensor is mandatory and the other application indicates that the sensor is optional, the priority framework may assign priority to the application where the sensor is mandatory.

Figure 5:
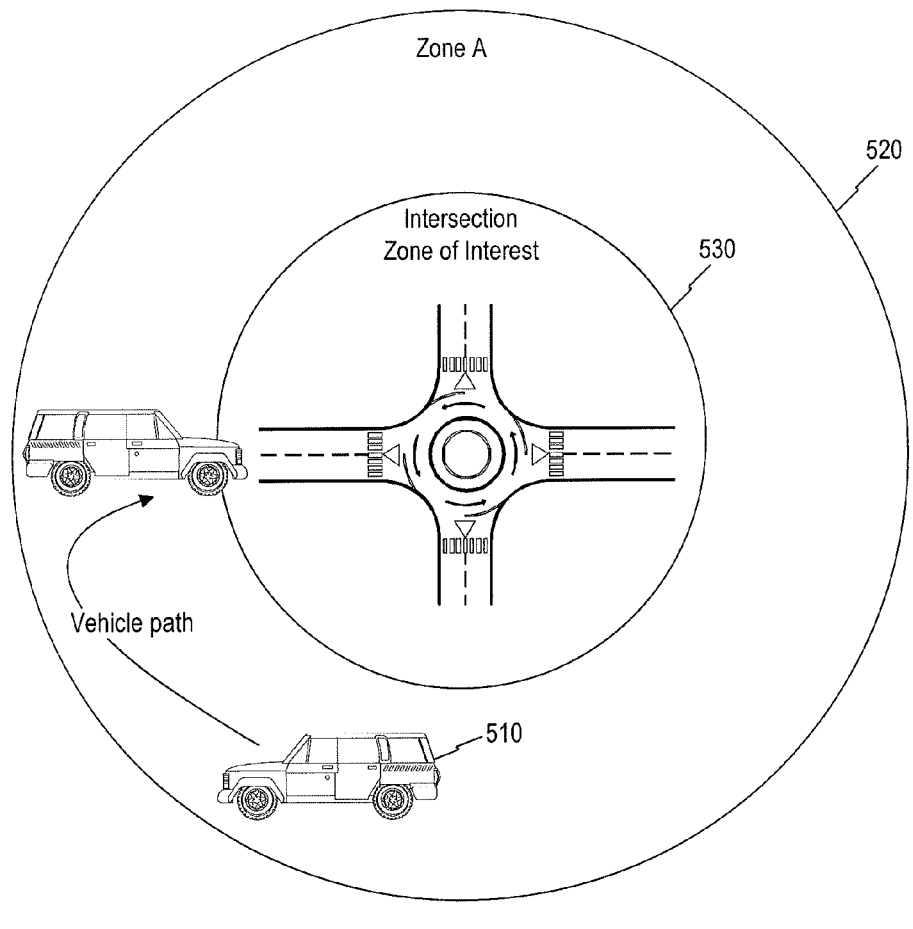
FIG. 5 is an illustration an exemplary collision warning system according to embodiments of the disclosure.

A second example of a system for performing adaptive sensor data selection and sampling based on current and future context according to an embodiment of the disclosure is described with respect to FIG. 5. The second example may be used with an intersection collision warning system. FIG. 5 an illustration of zones of interest and a chart 500 illustrating sensor types, context types, and context values according to the second example.

In the second example, the system includes 4 sensors: a temperature sensor, a GPS, an on board diagnostic sensor (OBD), and a light sensor. The temperature sensor, GPS, OBD, and light sensor may be integral to the vehicle 510, which represents the mobile device in this example.

The chart 500 illustrates the context type and exemplary context values for the data obtained by each of the sensors for the intersection collision warning system application. The temperature sensor measures context of type Environment:Temperature, and the context value may be one of cold, normal, or hot. The GPS measures context of type Environment:Location:GPS, and the context value may be one of inside intersection zone or outside intersection zone. The OBD measures context of type Environment:Car:Speed, and the context value may be one of normal, low, or high. The light sensor first measures context of type Environment:Light:Type, and the context value may be one of artificial or natural. The light sensor may also measure context of type Environment:Light: Intensity, and the context value may be one of dark, normal, or bright.

Based on inputs to the system of the second example, the system may know that a collision is more likely when a vehicle 510 enters a specific intersection 530 at a high speed when there is low visibility. Accordingly, during start up of the system, the GPS may be sampled to determine whether the vehicle 510 is in the zone of interest 530 (intersection). If the vehicle 510 is outside the zone of interest 530, the vehicle 510 may be considered in a zone 520 outside the zone of interest. Because the vehicle 510 is outside the zone of interest, the GPS sampling frequency may be reduced to a minimum frequency, and the other sensors may be turned off.

When the GPS detects that the vehicle 510 enters or is in the zone of interest 530, a predicted context may indicate that the vehicle is approaching the zone of interest. Based on the predicted context, the system may turn on the temperature, OBD and light sensors. Then, if a higher-level context based on the OBD sensor, the GPS, and context the light sensors is "vehicle travelling at high speed at an intersection zone with low visibility," a trigger may be sent to increase the GPS sampling rate. Also, the context manager may query the server to obtain a predicted context. The predicted context from the server may include a context indicating that "it is probable that there will be x-number of vehicles at high speed approaching the intersection at the time the vehicle reaches the intersection." For example, the server may store or have access to information from other vehicles near the zone of interest, and may determine the number of other vehicles likely to be approaching the intersection of interest at the same time based on the higher-level context provided by the vehicle 510. Based on the predicted context, a collision warning may be provided, and other appropriate action may be taken. For example, because it has been determined that visibility is low, the light sensors may be turned off, while the GPS and OBD sensors may continue to be sampled.

Once the vehicle 510 is outside of the zone of interest 530, the GPS sampling frequency may be returned to the low sampling rate, and the other sensors may be turned off.

Although described above with reference to examples of healthcare and vehicle safety applications, the disclosed systems and methods for performing adaptive sensor data selection and sampling based on current and future context may be applicable to other types of applications in various fields. For example, the disclosed systems and methods could be used with applications for monitoring energy usage and efficiency in a house, monitoring and safekeeping of soldiers, or any other applications where adaptive sensor data selection and sampling based on current and future context may be applicable.

Other embodiments of the invention will be apparent to those skilled in the art from consideration of the specification and practice of embodiments of the disclosure as disclosed herein. It is intended that the specification and examples be considered as exemplary only, with a true scope and spirit of the invention being indicated by the following claims.

What is claimed is:

1. A method comprising:
   receiving, by a mobile device, raw data from a sensor;
   classifying, by the mobile device, the raw data into a context value;
   interpreting, by the mobile device, the context value into a higher-level context;
   receiving, by the mobile device, a predicted context based on the higher-level context; and
   controlling, by the mobile device, the sensor based on the predicted context and a priority framework that indicates priority of control of the sensor between at least two applications running on the mobile device.

2. The method of claim 1, wherein the controlling includes controlling the sensor based on the higher-level context and the predicted context.

3. The method of claim 1, wherein the controlling includes controlling at least one of a frequency at which raw data is received from the sensor, or an on/off state of the sensor.

4. The method of claim 3, wherein the controlling includes adjusting, over time, based on the predicted context, at least one of the frequency at which raw data is received from the sensor, or the on/off state of the sensor.

5. The method of claim 1, further including:
   receiving raw data from a plurality of sensors;
   classifying the raw data into a plurality of context values;
   interpreting the context values into the higher-level context; and
   controlling the sensors based on the higher-level context and the predicted context.

6. The method of claim 5, wherein the controlling includes controlling at least one of a frequency at which raw data is received from each of the sensors, or a selection of the sensors to be enabled.

7. The method of claim 5, wherein the controlling includes turning off at least a first one of the sensors and increasing a sampling frequency of at least a second one of the sensors.

8. The method of claim 1, further including:
   sending the higher-level context to a server configured to determine the predicted context from the higher-level context; and
   receiving the predicted context from the server.

9. The method of claim 8, wherein interpreting the context value into the higher-level context is performed by one of the mobile device or the server, based on whether an amount of processing required for the interpreting exceeds a threshold processing limit.

10. The method of claim 1, wherein the sensor is physically integrated with the mobile device.

11. The method of claim 1, wherein the sensor is not physically integrated with the mobile device and communicates wirelessly with the mobile device.

12. The method of claim 1, further comprising:
    receiving the priority framework.

13. The method of claim 1, where the priority framework assigns priority to an affirmative selection of the sensor and a highest sampling frequency of the sensor.

14. A mobile device comprising:
    one or more processors to:
      receive raw data from sensors;
      classify the raw data into context values;
      interpret the context values into a higher-level context;
      send the higher-level context to a server;
      receive a predicted context based on the higher-level context from the server; and
      control the sensors based on the predicted context and a priority framework that indicates priority of control of the sensors between at least two applications running on the mobile device.

15. The mobile device of claim 14, where the one or more processors, when controlling the sensors, are to:

control at least one of a frequency at which raw data is received from each of the sensors, or a selection of the sensors to be enabled.

16. The mobile device of claim 15, where the one or more processors, when controlling the sensors, are to:
adjust, over time, based on the predicted context, at least one of the frequency at which raw data is received from each of the sensors, or the selection of the sensors to be enabled.

17. The mobile device of claim 14, wherein at least one of the sensors is physically integrated with the mobile device.

18. The mobile device of claim 17, wherein at least one of the sensors is not physically integrated with the mobile device and communicates wirelessly with the mobile device.

19. The mobile device of claim 14, wherein the mobile device is a cell phone.

20. The mobile device of claim 14, where the one or more processors are further to:
receive the priority framework.

21. A non-transitory computer-readable storage medium, comprising:
one or more instructions that, when executed by one or more processors of a device, cause the one or more processors to:
receive raw data from sensors;
classify the raw data into context values;
interpret the context values into a higher-level context;
receive a predicted context based on the higher-level context; and
control the sensors based on the higher-level context, the predicted context, and a priority framework that indicates priority of control of the sensors between at least two applications running on the device.

22. The non-transitory storage medium of claim 21, where the one or more instructions, when controlling the sensors, cause the one or more processors to:
control at least one of a frequency at which raw data is received from the sensors, or a selection of the sensors to be enabled.

23. The non-transitory storage medium of claim 21, where the one or more instructions, when controlling the sensors, cause the one or more processors to:
turn off at least a first one of the sensors and increase a sampling frequency of at least a second one of the sensors.

24. The non-transitory storage medium of claim 21, the one or more instructions further comprising instructions to:
receive the priority framework.

\* \* \* \* \*